(12) United States Patent
Colvin et al.

(10) Patent No.: US 9,783,188 B2
(45) Date of Patent: Oct. 10, 2017

(54) EV MODE SHIFT STRATEGY FOR HYBRID VEHICLE

(71) Applicant: FORD GLOBAL TECHNOLOGIES, LLC, Dearborn, MI (US)

(72) Inventors: Daniel Scott Colvin, Farmington Hills, MI (US); Christopher Alan Lear, Dearborn, MI (US); Bernard D. Nefcy, Novi, MI (US); Andrew E. Burt, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 14/994,754

(22) Filed: Jan. 13, 2016

(65) Prior Publication Data

US 2017/0197609 A1    Jul. 13, 2017

(51) Int. Cl.

| B60W 20/14 | (2016.01) |
| B60W 10/08 | (2006.01) |
| B60W 10/10 | (2012.01) |
| B60K 6/46 | (2007.10) |

(52) U.S. Cl.
CPC .............. *B60W 20/14* (2016.01); *B60K 6/46* (2013.01); *B60W 10/08* (2013.01); *B60W 10/10* (2013.01); *B60W 2510/1005* (2013.01); *B60W 2510/246* (2013.01); *B60W 2710/081* (2013.01); *B60W 2710/086* (2013.01); *B60W 2710/1005* (2013.01); *B60Y 2200/92* (2013.01); *B60Y 2300/18125* (2013.01); *B60Y 2300/20* (2013.01); *Y10S 903/93* (2013.01); *Y10S 903/947* (2013.01)

(58) Field of Classification Search
None
See application file for complete search history.

(56) References Cited

U.S. PATENT DOCUMENTS

| 5,720,690 | A |  | 2/1998 | Hara et al. |
| 5,893,294 | A |  | 4/1999 | Hosseini et al. |
| 5,935,040 | A |  | 8/1999 | Tabata et al. |
| 6,090,007 | A |  | 7/2000 | Nakajima et al. |
| 6,125,314 | A |  | 9/2000 | Graf et al. |
| 6,164,400 | A |  | 12/2000 | Jankovic et al. |
| 6,176,808 | B1 |  | 1/2001 | Brown et al. |
| 6,514,172 | B2 |  | 2/2003 | Kayano et al. |
| 6,560,522 | B2 |  | 5/2003 | Katakura et al. |
| 6,746,366 | B2 |  | 6/2004 | Tamor |
| 6,867,509 | B1 | * | 3/2005 | Takaoka ................ B60K 6/365 180/65.25 |
| 7,479,761 | B2 | * | 1/2009 | Okumura ............ B60L 11/1861 320/132 |

(Continued)

*Primary Examiner* — Russell Frejd
(74) *Attorney, Agent, or Firm* — David Kelley; Brooks Kushman P.C.

(57) ABSTRACT

A vehicle includes a generator, a battery, a transmission, and a controller. The generator is configured to recharge the battery at a maximum power output when a generator speed is above a threshold speed. The transmission is configured to downshift during regenerative braking such that the generator speed is maintained above the threshold speed. The controller is programmed to, in response to a decrease in battery temperature corresponding to a decrease in generator speed required to maintain the maximum power output, decrease the threshold speed.

16 Claims, 5 Drawing Sheets

(56) References Cited

U.S. PATENT DOCUMENTS

| | | | |
|---|---|---|---|
| 7,637,846 B2* | 12/2009 | Tamai | F16H 61/16 |
| | | | 477/110 |
| 7,673,714 B2 | 3/2010 | Soliman et al. | |
| 7,967,091 B2 | 6/2011 | Yamazaki et al. | |
| 8,010,264 B2* | 8/2011 | Ogata | B60K 6/48 |
| | | | 123/339.16 |
| 8,548,662 B2 | 10/2013 | Kishi et al. | |
| 2001/0039230 A1 | 11/2001 | Severinsky et al. | |
| 2002/0016660 A1 | 2/2002 | Suzuki et al. | |
| 2002/0033059 A1 | 3/2002 | Pels et al. | |
| 2003/0085577 A1* | 5/2003 | Takaoka | B60K 6/365 |
| | | | 290/40 C |
| 2005/0245350 A1 | 11/2005 | Tabata et al. | |
| 2007/0216312 A1* | 9/2007 | Ogata | B60K 6/48 |
| | | | 315/131 |
| 2008/0146407 A1 | 6/2008 | Tuckfield | |
| 2008/0147284 A1 | 6/2008 | Tuckfield et al. | |
| 2009/0036267 A1 | 2/2009 | Bellinger | |
| 2009/0118915 A1 | 5/2009 | Heap et al. | |
| 2010/0241323 A1 | 9/2010 | Cunningham et al. | |
| 2010/0292046 A1 | 11/2010 | Kaltenbach | |
| 2012/0265382 A1 | 10/2012 | Nefcy et al. | |
| 2013/0096789 A1 | 4/2013 | McDonnell et al. | |
| 2013/0296100 A1 | 11/2013 | Nefcy et al. | |
| 2013/0297123 A1 | 11/2013 | Gibson et al. | |
| 2014/0066250 A1 | 3/2014 | Schulte et al. | |
| 2015/0266383 A1 | 9/2015 | Kidston et al. | |
| 2015/0360691 A1* | 12/2015 | Nefcy | B60W 30/18127 |
| | | | 701/22 |

\* cited by examiner

EV MODE SHIFT STRATEGY FOR HYBRID VEHICLE

TECHNICAL FIELD

The present disclosure relates to hybrid vehicles and transmission shift strategies for hybrid vehicles.

BACKGROUND

The available power output of a motor/generator in a hybrid vehicle may be limited while the hybrid vehicle is operating in an electric only (EV) mode of operation. This power limitation may be caused by the need to conserve an amount of energy required to start a combustion engine for when the vehicle transitions from the EV mode of operation to a hybrid or engine only mode.

SUMMARY

A vehicle includes a generator, a battery, a transmission, and a controller. The generator is configured to recharge the battery at a maximum power output when a generator speed is above a threshold speed. The transmission is configured to downshift during regenerative braking such that the generator speed is maintained above the threshold speed. The controller is programmed to, in response to a decrease in battery temperature corresponding to a decrease in generator speed required to maintain the maximum power output, decrease the threshold speed.

A vehicle includes a generator, a battery, a transmission, and a controller. The generator is configured to recharge the battery at a maximum power output when a generator speed is above a threshold speed. The transmission is configured to downshift during regenerative braking such that the generator speed is maintained above the threshold speed. The controller is programmed to, in response to an increase in battery temperature corresponding to an increase in generator speed required to maintain the maximum power output, increase the threshold speed.

A vehicle includes an electric machine, a battery, a transmission, and a controller. The electric machine is configured to recharge the battery during regenerative braking. The transmission is configured to shift during regenerative braking to maintain a minimum electric machine speed corresponding to a lower threshold speed of a maximum power output region. The controller is programmed to, in response to a decrease in battery temperature corresponding to a decrease in electric machine speed required to maintain the maximum power output, decrease the threshold speed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
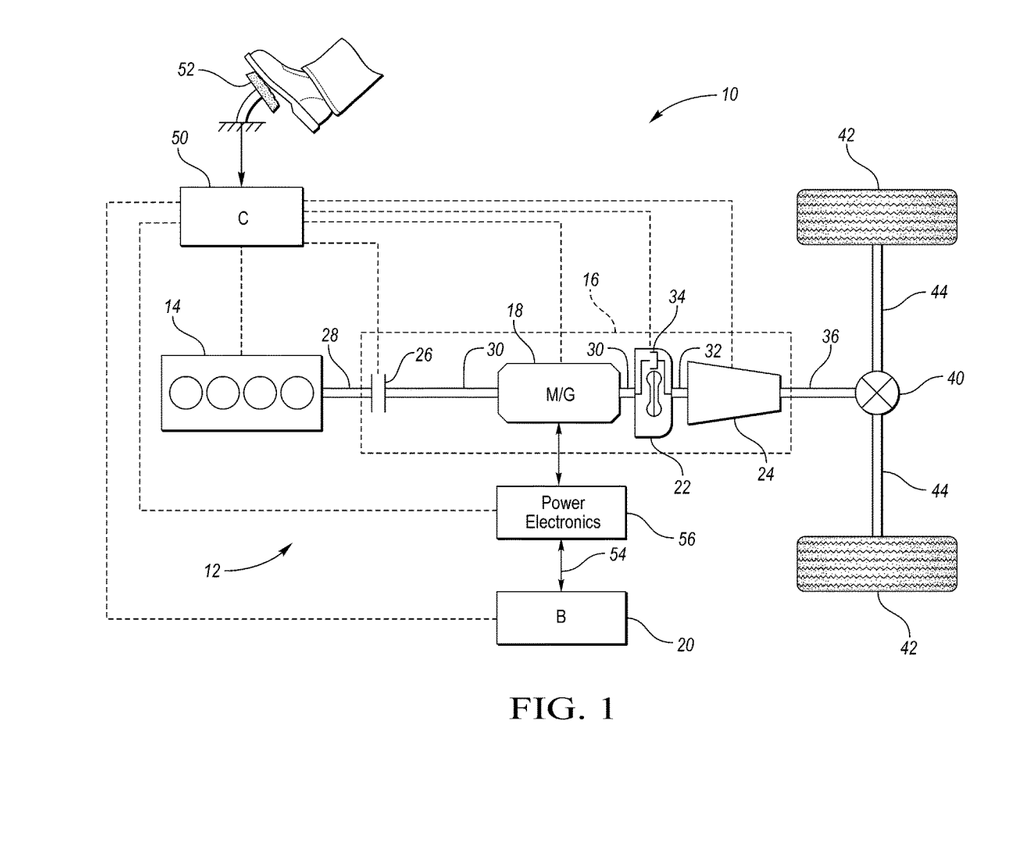
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the REV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34, in some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational or motive) energy or power from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
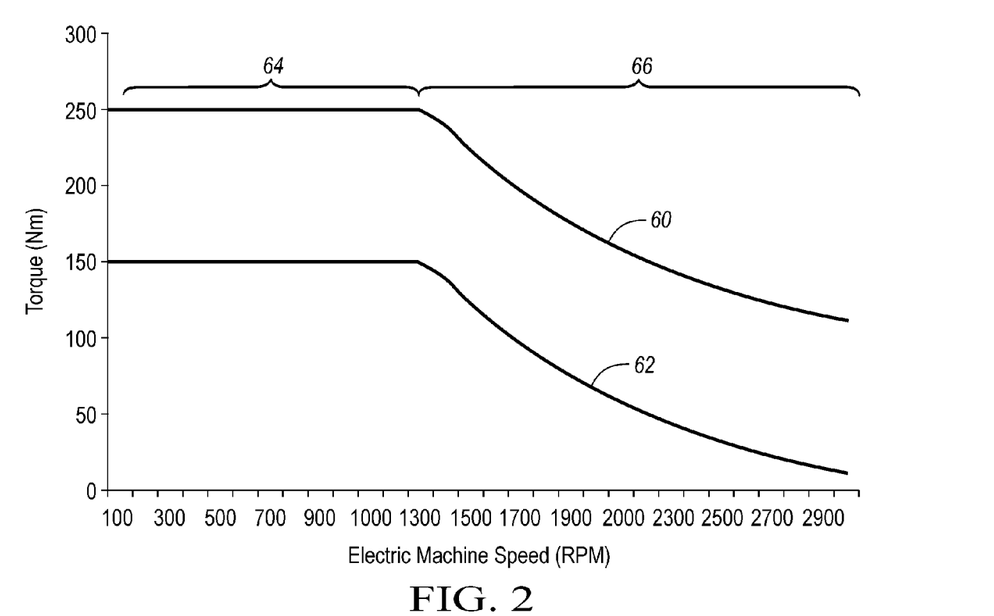
FIG. 2 is an exemplary graph illustrating both a maximum torque output and an available torque output of an electric machine at a first battery temperature.
Figure 3:
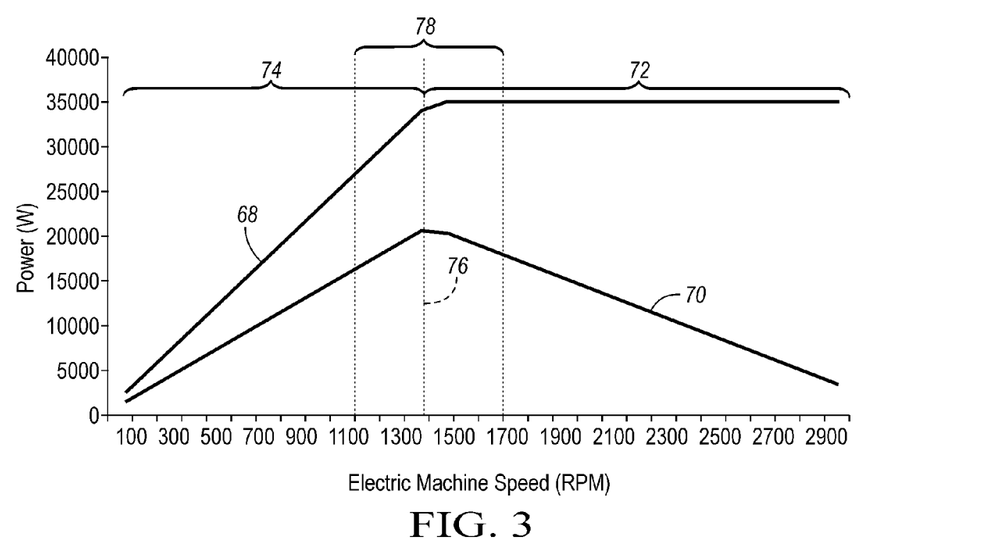
FIG. 3 is an exemplary graph illustrating both a maximum power output and an available power output of the electric machine at the first battery temperature.
Figure 4:
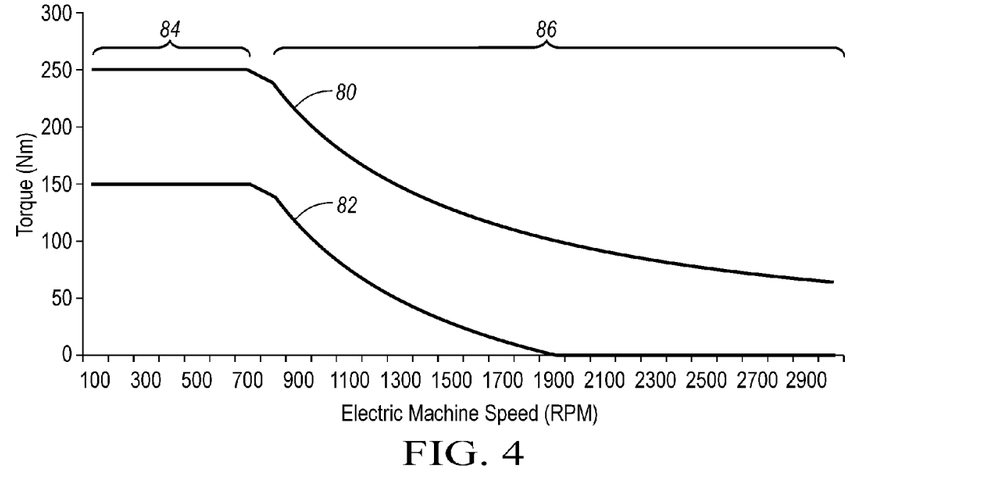
FIG. 4 is an exemplary graph illustrating both a maximum torque output and an available torque output of the electric machine at a second battery temperature.
Figure 5:
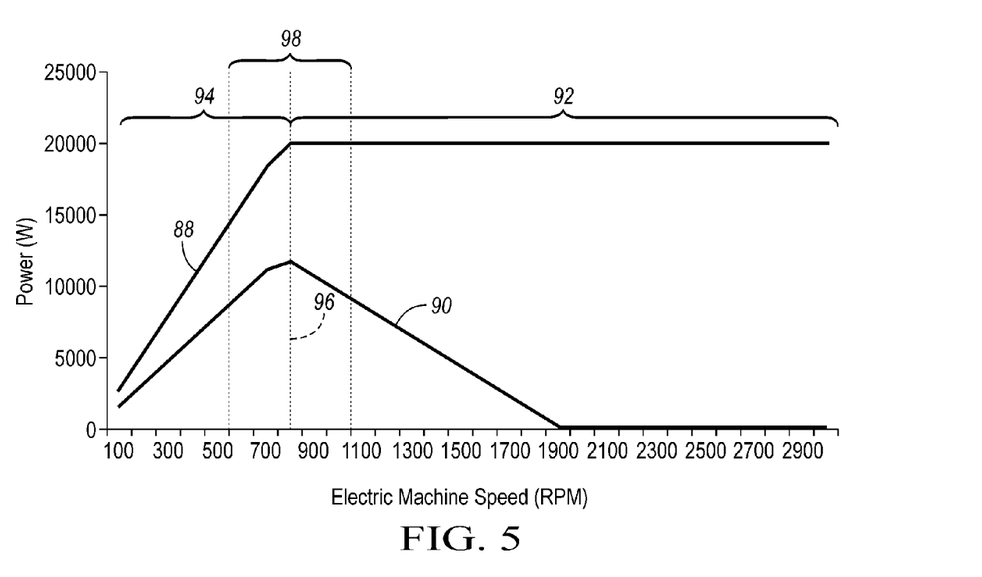
FIG. 5 is an exemplary graph illustrating both a maximum power output and an available power output of the electric machine at the second battery temperature.

FIGS. 2-5 represent the torque generating capability and the power capacity of the M/G 18 relative to the rotational speed of the M/G 18 based on discharge limits of the battery 20 at different temperatures. FIGS. 2 and 3 represent the torque generating capability and power capacity, respectively, of the M/G 18 at a first battery temperature. FIGS. 4 and 5 represent the torque generating capability and power capacity, respectively, of the M/G 18 at a second battery temperature. The torque generating capability and power capacity of the M/G 18 will increase towards a maximum value when the battery temperature is within a certain temperature range. To demonstrate this relationship, the battery temperature represented in FIGS. 2 and 3 falls within a battery temperature region that corresponds to increased values of torque generating capability and power capacity of the M/G 18 relative to the second battery temperature represented in FIGS. 4 and 5. The first battery temperature represented in FIGS. 2 and 3 may have a higher temperature value than the battery temperature represented in FIGS. 4 and 5. Specifically, the battery temperature in FIGS. 2 and 3 may be approximately 70° F., while the battery temperature in FIGS. 4 and 5 may be approximately 20° F. It should be understood, however, that the graphs in FIG. 2-5 are for exemplary purposes only to demonstrate that the torque generating capability and power capacity of the M/G 18 will differ depending on the battery temperature.

Referring to FIG. 2, an exemplary graph depicting both a maximum torque output and an available torque output of the M/G 18 at a first battery temperature when the HEV 10 is operating in the EV mode is illustrated. The horizontal axis of the graph represents the rotational speed of the M/G 18 while the vertical axis of the graph represents the torque of the M/G 18. The maximum torque output of the M/G 18 relative to rotational speed of the M/G 18 is represented by line 60. The available torque output of the M/G 18 relative to rotational speed of the M/G 18 is represented by line 62. The available torque output 62 is the difference between the maximum torque output 60 and a reserve torque that is required to restart the engine 14 with the M/G 18 for when the HEV 10 transitions from the EV mode to an engine only mode or a hybrid mode. The torque of the M/G 18 may remain relatively constant across a range of lower rotational speeds of the M/G 18. This range may be referred to as the constant torque output region or constant maximum torque output region 64 of the M/G 18. Once the rotational speed of the M/G 18 exceeds a threshold of the constant maximum torque output region 64, the torque gradually decreases as the rotational speed of the M/G 18 increases. This range may be referred to as the non-constant torque output region 66.

Referring to FIG. 3, an exemplary graph depicting both a maximum power output and an available power output of the M/G 18 when the HEV 10 is operating in the EV mode at the first battery temperature is illustrated. The horizontal axis of the graph represents the rotational speed of the M/G 18 while the vertical axis of the graph represents the power output of the M/G 18. The maximum power output of the M/G 18 relative to rotational speed of the M/G 18 is represented by line 68. The maximum power output of the M/G 18 is a function of the power limits of the M/G 18, the power limits battery 20, and the power limits of other components of the hybrid electrical system (such as the power electronics 56). The available power output of the M/G 18 relative to rotational speed of the M/G 18 is represented by line 70. The available power output 70 is the difference between the maximum power output 68 and the a reserve power that is required to restart the engine 14 with the M/G 18 for when the HEV 10 transitions from the EV mode to an engine only mode or a hybrid mode.

The maximum power output 68 of the M/G 18 may remain relatively constant across a range of higher rotational speeds of the M/G 18. This range may be referred to as the constant maximum power output region 72 of the M/G 18. Prior to the speed of the M/G 18 entering the constant maximum power output region 72, the maximum power output 68 of the M/G 18 gradually increases as the rotational speed of the M/G 18 increases until obtaining a threshold speed corresponding to entering the constant maximum power output region 72. This range may be referred to as the non-constant power output region 74.

The available power output 70 of the M/G 18 gradually increases as the rotational speed of the M/G 18 increases from zero to a peak value 76. At the peak value 76 speed of the M/G 18 the available power output 70 reaches a maximum value. The available power output 70 of the M/G 18 begins to gradually decrease as the rotational speed of the M/G 18 increases beyond the peak value 76. A range of rotational speeds of the M/G 18 that is within a proximity of and including the peak value 76 may correspond to a peak range 78 of the available power output of the M/G 18. The peak range 78 may correspond to a desired range of rotational speeds of the M/G 18 to increase the power output of the M/G 18 while the M/G 18 is operating in the EV mode. The peak range 78 depicted in FIG. 3 could be either expanded or narrowed but should include the maximum value of the available power output 70.

Referring to FIG. 4, an exemplary graph depicting both a maximum torque output and an available torque output of the M/G 18 at a second battery temperature when the HEV 10 is operating in the EV mode is illustrated. The horizontal axis of the graph represents the rotational speed of the M/G 18 while the vertical axis of the graph represents the torque of the M/G 18. The maximum torque output of the M/G 18 relative to rotational speed of the M/G 18 is represented by line 80. The available torque output of the M/G 18 relative to rotational speed of the M/G 18 is represented by line 82. The available torque output 82 is the difference between the maximum torque output 80 and a reserve torque that is required to restart the engine 14 with the M/G 18 for when the HEV 10 transitions from the EV mode to an engine only mode or a hybrid mode. The torque of the M/G 18 may remain relatively constant across a range of lower rotational speeds of the M/G 18. This range may be referred to as the constant torque output region or constant maximum torque output region 84 of the M/G 18. Once the rotational speed of the M/G 18 exceeds a threshold of the constant maximum torque output region 84, the torque gradually decreases as the rotational speed of the M/G 18 increases. This range may be referred to as the non-constant torque output region 86.

It should be noted that the constant maximum torque output region 84 depicted in FIG. 4 is smaller than the constant maximum torque output region 64 depicted in FIG. 2. This demonstrates that the torque generating capability of the M/G 18 changes as the battery temperature changes. In the specific example of FIGS. 2 and 4, the torque generating capability of the M/G 18 is less at the second temperature (and lower temperature) than at the first temperature as the rotational speed of the M/G 18 increases.

Referring to FIG. 5, an exemplary graph depicting both a maximum power output and an available power output of the M/G 18 when the HEV 10 is operating in the EV mode at the second battery temperature is illustrated. The horizontal axis of the graph represents the rotational speed of the M/G 18 while the vertical axis of the graph represents the power output of the M/G 18. The maximum power output of the M/G 18 relative to rotational speed of the M/G 18 is represented by line 88. The available power output of the M/G 18 relative to rotational speed of the M/G 18 is represented by line 90. The available power output 90 is the difference between the maximum power output 88 and a reserve power that is required to restart the engine 14 with the M/G 18 for when the HEV 10 transitions from the EV mode to an engine only mode or a hybrid mode.

The maximum power output 88 of the M/G 18 may remain relatively constant across a range of higher rotational speeds of the M/G 18. This range may be referred to as the constant maximum power output region 92 of the M/G 18. Prior to the speed of the M/G 18 entering the constant maximum power output region 92, the maximum power output 88 of the M/G 18 gradually increases as the rotational speed of the M/G 18 increases until obtaining a threshold speed corresponding to entering the constant maximum power output region 92. This range may be referred to as the non-constant power output region 94.

The available power output 90 of the M/G 18 gradually increases as the rotational speed of the M/G 18 increases from zero to a peak value 96. At the peak value 96 speed of the M/G 18 the available power output 90 reaches a maximum value. The available power output 90 of the M/G 18 begins to gradually decrease as the rotational speed of the M/G 18 increases beyond the peak value 96. A range of rotational speeds of the M/G 18 that is within a certain proximity of and including the peak value 96 may correspond to a peak range 98 of the available power output of the M/G 18. The peak range 98 may correspond to a desired range of rotational speeds of the M/G 18 to increase the power output of the M/G 18 while the M/G 18 is operating in the EV mode. The peak range 98 depicted in FIG. 5 could be either expanded or narrowed but should include the maximum value of the available power output 90.

It should be noted both the maximum power output 88 and the available power output 90 of the M/G 18 depicted in FIG. 5 are smaller than the maximum power output 68 and the available power output 70 depicted in FIG. 3, respectively. This demonstrates that the power capacity of the M/G 18 changes as the battery temperature changes. In the specific example of FIGS. 3 and 5, the power capacity of the M/G 18 at corresponding rotational speeds of the M/G 18 is less at the second temperature (and lower temper) than at the first temperature.

Figure 6:
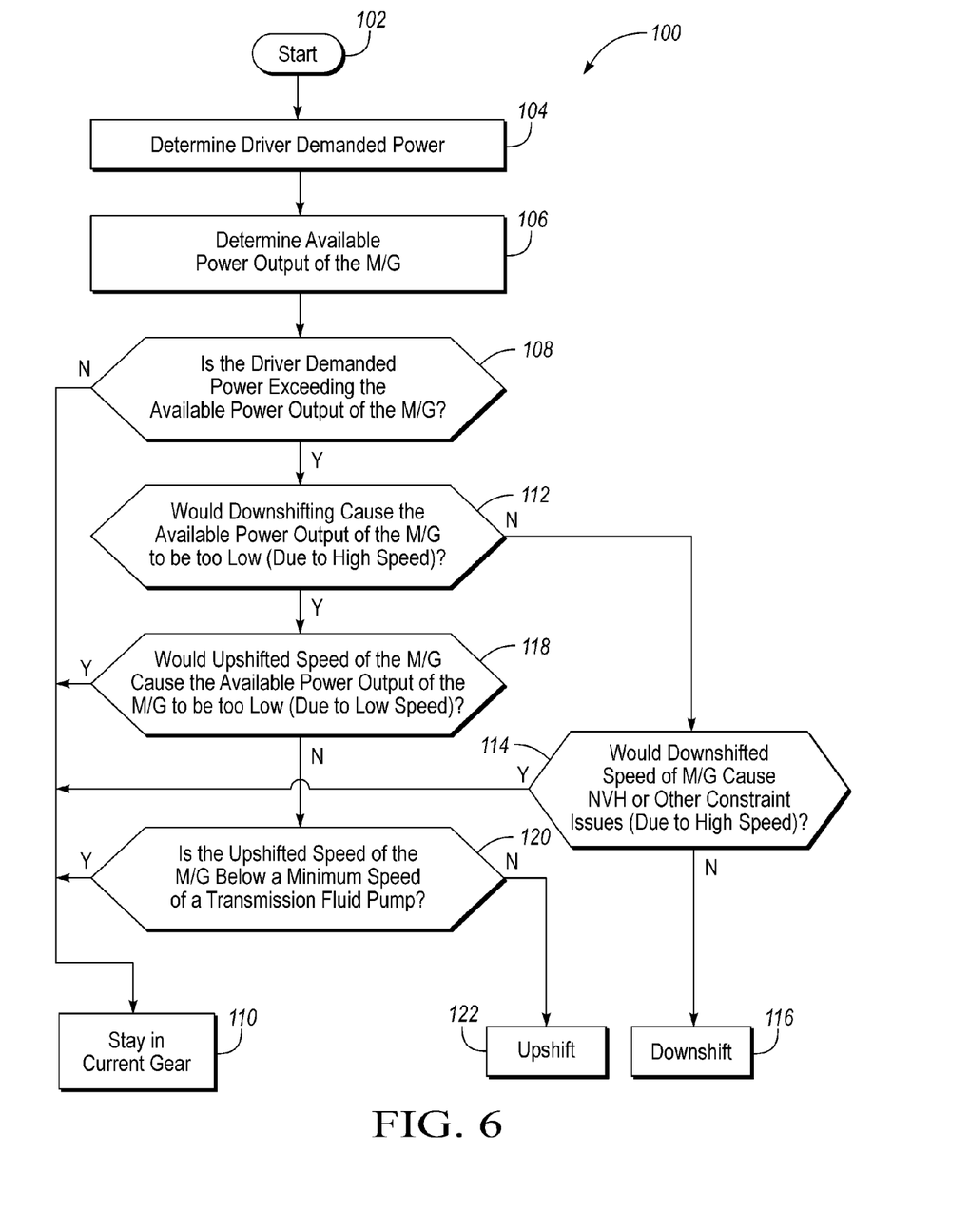
FIG. 6 is a flowchart illustrating a method of shifting a transmission in a hybrid vehicle while the hybrid vehicle is operating in a EV mode.

Referring to FIG. 6, a flowchart illustrating a method 100 of shifting the transmission (i.e., gearbox 24) of the HEV 10 while the HEV 10 is operating in an EV mode is depicted. The controller 50 may issue instructions to the gearbox 24 to perform the shifting method 100 which may be stored as control logic or an algorithm within the memory of the controller 50. The method 100 includes adjusting the shift schedule of the gearbox 24 to drive the speed of the M/G 18 towards a range corresponding to a peak range of available power output of the M/G 18, such as the peak ranges 78, 98 discussed above. Adjusting the shift schedule to drive the speed of the M/G 18 towards a range corresponding to the peak range of available power output may include shifting the gears within the gearbox 24 to increase the available power output of the M/G 18 in response to a demanded power of the M/G 18 exceeding the available power output of the M/G 18.

The method 100 is initiated at the start block 102. The method 100 may be initiated when the HEV 10 enters the EV mode. After the method 100 is initiated at the start block 102, the driver demanded power is determined at step 104. Next, the available power output of the M/G 18 is determined at step 106. The available power output of the M/G 18 may be determined at step 106 as described above with the available power output of the M/G 18 being the difference between the maximum power output and the reserve power that is required to restart the engine 14 with the M/G 18. The available power output and maximum power output of the M/G 18 may be both functions of the temperature of the battery 20 as described above with reference to FIGS. 3 and 5. It should be understood, however, that FIGS. 3 and 5 are for exemplary purposes only and that available power output and maximum power output of the M/G 18 may be functions of a wider array operating temperatures.

Once the driver demanded power and the available power output of the M/G 18 are determined, the method moves on to step 108 where it is determined if the driver demanded power exceeds the available power output of the M/G 18. If the driver demanded power does not exceed the available power output of the M/G 18, the method 100 moves on to step 110 where the gearbox 24 is commanded to stay in the current gear.

If the driver demanded power does exceed the available power output of the M/G 18, the method 100 moves on to step 112 where it is determined if downshifting the gearbox 24 would increase the speed of the M/G 18 such that the speed of the M/G 18 would exceed a threshold speed corresponding to the available power output of the M/G 18 falling below a threshold value (e.g., would the downshift cause the speed M/G 18 to exceed an upper threshold which in turn would cause the available power output to drop and fall outside of the peak range).

If it is determined at step 112 that downshifting the gearbox 24 would not increase the speed of the M/G 18 such that the speed of the M/G 18 exceeds a threshold speed causing the available power output of the M/G 18 to fall below a threshold value, the method 100 moves on to step 114 where it is determined if downshifting the gearbox 24 would cause any noise, vibration, or harshness (NVH) issues. If it is determined that downshifting the gearbox 24 would cause NVH issues, the method 100 moves on to step 110 where the gearbox 24 is commanded to stay in the current gear. If it is determined that downshifting gearbox 24 would not cause any NVH issues, method 100 moves on to step 116 where the gearbox 24 is commanded to downshift.

Alternatively, with regard to downshifting, the gearbox 24 may be downshifted to increase the speed of the M/G 18 in response to the speed of the M/G 18 falling below a threshold value which in turn causes the available power output of the M/G 18 to fall outside of the peak range. In this alternative embodiment, the shift schedule is adjusted when the HEV 10 enters the EV mode to include downshifting the gearbox 24 to increase the speed of the M/G 18 (and therefore increase the available power output of the M/G 18 to drive the available power output of the M/G 18 towards the peak range) in response to the speed of the M/G 18 falling below a threshold value that causes the available power output fall outside of the peak range. The threshold speed that M/G 18 needs to drop to before the downshift occurs may be within or approaching a constant maximum torque output region of the M/G 18, as described above with regard to FIGS. 2 and 4.

Returning to step 112, if it is determined that downshifting gearbox 24 would increase the speed of the M/G 18 such that the speed of the M/G 18 would exceed a threshold speed causing the available power output of the M/G 18 to fall below a threshold value, the method 100 moves on to step 118. At step 118, it is determined if upshifting the gearbox 24 would decrease the speed of the M/G 18 such that the speed of the M/G 18 would fall below a threshold speed corresponding to the available power output of the M/G 18 falling below a threshold value (e.g., would the upshift cause the speed M/G 18 to fall below a lower threshold which in turn would cause the available power output to drop and fall outside of the peak range).

If it is determined at step 118 that upshifting the gearbox 24 would not decrease the speed of the M/G 18 such that the speed of the M/G 18 falls below a threshold speed corresponding to the available power output of the M/G 18 falling below a threshold value, the method 100 moves on to step 120 where it is determined if upshifting the gearbox 24 based on a desired upshift would cause a transmission fluid pump to fall below a minimum speed required to maintain a minimum transmission fluid pressure to operate the clutches, pistons, and other hydraulically operated parts within the gearbox 24. If it is determined that upshifting the gearbox 24 based on a desired upshift would cause the transmission fluid pump to fall below a minimum speed, the method 100 moves on to step 110 where the gearbox 24 is commanded to stay in the current gear. If it is determined that upshifting gearbox 24 would not cause the transmission fluid pump to fall below a minimum speed, method 100 moves on to step 122 where the gearbox 24 is commanded to upshift.

Returning to step 118, if it is determined that upshifting the gearbox 24 would decrease the speed of the M/G 18 such that the speed of the M/G 18 would fall below a threshold causing the available power output of the M/G 18 to fall below a threshold value, the method 100 moves on to step 110 where the gearbox 24 is commanded to stay in the current gear.

Alternatively, with regard to upshifting, the gearbox 24 may be upshifted to decrease the speed of the M/G 18 in response to the speed of the M/G 18 exceeding a threshold value which in turn causes the available power output of the M/G 18 to fall outside of the peak range. In this alternative embodiment, the shift schedule is adjusted when the HEV 10 enters the EV mode to include upshifting the gearbox 24 to decrease the speed of the M/G 18 (and therefore increase the available power output of the M/G 18 to drive the available power output of the M/G 18 towards the peak range) in response to the speed of the M/G 18 exceeding a threshold value that causes the available power output fall outside of the peak range. The threshold speed that M/G 18 needs to exceed before the upshift occurs may be within or approaching a constant maximum power output region of the M/G 18, as described above with regard to FIGS. 3 and 5.

The method 100 may continue to operate as described above as long at the HEV 10 is operating in the EV mode. Once the HEV 10 transitions to a hybrid mode or engine only mode of operation the method 100 will end.

The method 100 depicted in FIG. 6 is for illustrative purposes only. The disclosure should be construed to include embodiments of the method 100 where some of the steps may be rearranged or omitted.

Figure 7:
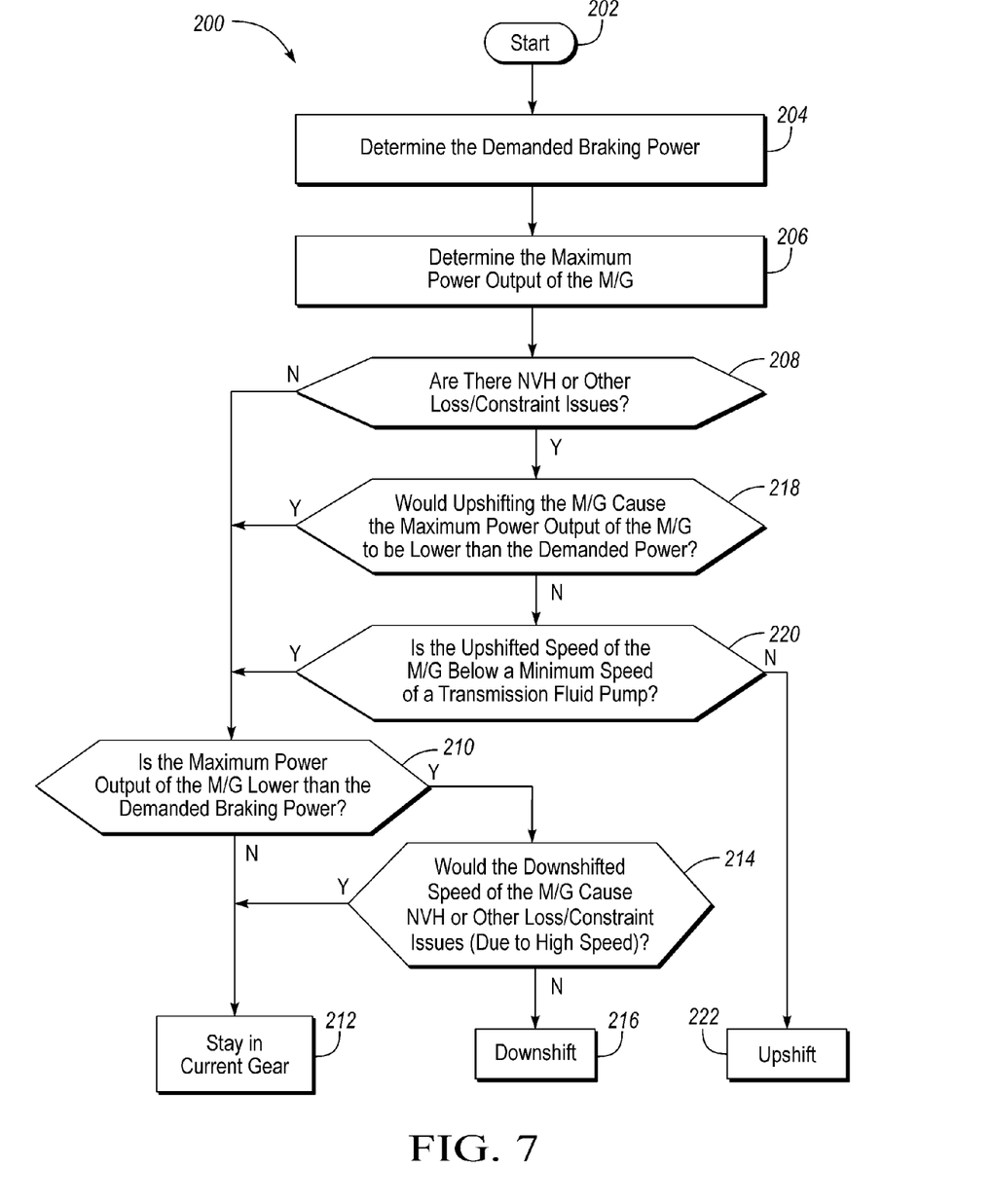
FIG. 7 is a flowchart illustrating a method of shifting the transmission during a regenerative braking event.

Referring to FIG. 7, a flowchart illustrating a method 200 of shifting the transmission (i.e., gearbox 24) of the HEV 10 during a regenerative braking event is depicted. The controller 50 may issue instructions to the gearbox 24 to perform the shifting method 200 which may be stored as control logic or an algorithm within the memory of the controller 50. The method 200 includes adjusting the shift schedule of the gearbox 24 during a regenerative braking event to drive the speed of the M/G 18 towards a maximum power output region, such as the maximum power output regions 72, 92 discussed above.

The method 200 is initiated at the start block 202. The method 200 may be initiated when the HEV 10 begins to brake which may include regenerative braking. After the method 200 is initiated at the start block 202, the demanded braking power is determined at step 204. Next, the method 200 moves on to step 206 where the maximum power output of the M/G 18 (that may be used to recharge the battery 20 during regenerative braking) is determined. The maximum power output of the M/G 18 may be based on the temperature of the battery 20. As discussed above the maximum power output region will change as the battery temperature changes. For example, the maximum power output region at the first temperature depicted in FIG. 3 is higher than the maximum power output region at the second temperature in FIG. 5. It should be understood, however, that FIGS. 3 and 5 are for exemplary purposes only and that maximum power output region may be a function of a wider array operating temperatures. Once the demanded braking power and the maximum power output of the M/G 18 are determined, the method 200 moves on to step 208 where it is determined if there are any NVH or other loss/constraint issues. If there are no NVH or other loss/constraint issues, the method 200 moves on to step 210.

At step 210, the method 200 determines if the maximum power output of the M/G 18 is lower than the demanded braking power. If the maximum power output of the M/G 18 is not lower than demanded braking power, the method 200 moves on to step 212 where the gearbox 24 is commanded to stay in the current gear. If the maximum power output of the M/G 18 is lower the demanded braking power, the method 200 moves on to step 214 where it is determined if downshifting the gearbox 24 would cause any noise, vibration, or harshness (NVH) issues due to the speed of the M/G 18 being too high. If it is determined that downshifting the gearbox 24 would cause NVH issues, the method 200 moves on to step 212 where the gearbox 24 is commanded to stay in the current gear. If it is determined that downshifting gearbox 24 would not cause any NVH issues, the method 200 moves on to step 216 where the gearbox 24 is commanded to downshift.

Alternatively, with regard to downshifting during regenerative braking, the gearbox 24 may be downshifted due to the speed of the M/G 18 falling below a threshold which in turn causes the maximum power output to fall outside of the constant maximum power output region. In this alternative embodiment, the shift schedule includes downshifting the gearbox 24 to increase the speed of the M/G 18 (and therefore increase the maximum power output of the M/G 18) in response to the speed of the M/G 18 falling below a threshold value that causes the maximum power output of the M/G 18 to drop below a threshold value and fall outside of the constant maximum power output region. The threshold speed that M/G 18 needs to drop to before the downshift occurs may be within a constant maximum torque output region of the M/G 18 or within a range below the constant maximum torque output region of the M/G 18, as described above with regard to FIGS. 2 and 4.

Returning to step 208, if it is determined that there are NVH or other loss/constraint issues, the method 200 moves on to step 218 where it is determined if upshifting the gearbox 24 would cause the maximum power output of the M/G 18 to be lower than the demanded braking power. If it is determined at step 218 that upshifting the gearbox 24 would cause the maximum power output of the M/G 18 to be lower than the demanded braking power, the method 200 returns to step 210 and follows the process from step 210 as described above.

If it is determined at step 218 that upshifting the gearbox 24 would not cause the maximum power output of the M/G 18 to be lower than the demanded braking power, the method 200 moves on to step 220 where it is determined if upshifting the gearbox 24 would cause a transmission fluid pump to fall below a minimum speed required to maintain a minimum transmission fluid pressure to operate the clutches, pistons, and other hydraulically operated parts within the gearbox 24. If it is determined that upshifting the gearbox 24 would cause the transmission fluid pump to fall below a minimum speed, the method 200 returns to step 210 and follows the process from step 210 as described above. If it is determined that upshifting gearbox 24 would not cause the transmission fluid pump to fall below a minimum speed, method 200 moves on to step 222 where the gearbox 24 is commanded to upshift.

Before the upshift occurs following steps 218, 220 and 222, the difference between the speed of the M/G 18 and a threshold speed required to maintain the maximum power output of the M/G 18 may have to exceed an allowable deviation before the upshift may occur (which will result in a drop in the speed of the M/G 18). Additionally, once the upshift occurs, the speed of the M/G 18 should remain above the threshold speed required to maintain the maximum power output of the M/G 18.

The method 200 may continue to operate as described above as long as the HEV 10 is braking through regenerative braking. Once regenerative braking ceases, the method 200 will end.

The method 200 depicted in FIG. 7 is for illustrative purposes only. The disclosure should be construed to include embodiments of the method 200 where some of the steps may be rearranged or omitted.

It should be understood that the hybrid vehicle configuration in FIG. 1 is merely exemplary and is not intended to be limited. The disclosure as described herein may be applicable to electric and other hybrid vehicle configurations that include an electric machine that provide motive power to the vehicle and inputs power to a multiple step-ratio automatic transmission. Other hybrid and electric vehicle configurations that should be construed as disclosed herein include series hybrid vehicles, parallel hybrid vehicles, series-parallel hybrid vehicles, power-split hybrid vehicles, plug-in hybrid electric vehicles (PHEVs), fuel cell hybrid vehicles, battery operated electric vehicles (BEVs), or any other hybrid or electric vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a generator that recharges a battery at a maximum power when operating above a speed threshold;
    a transmission that downshifts during regenerative braking to maintain generator operation above the threshold; and
    a controller programmed to, in response to decreasing battery temperature resulting in decreasing generator speed required to generate maximum power, decrease the threshold, and in response to a desired transmission downshift corresponding to system vibrations, maintain a current transmission gear.

2. The vehicle of claim 1, wherein the controller is further programmed to, in response to an increase in battery temperature corresponding to an increase in generator speed required to maintain the maximum power output, increase the threshold.

3. The vehicle of claim 1, wherein the threshold is within a constant maximum power output region of the generator.

4. The vehicle of claim 1, wherein the threshold is within a constant maximum torque output region of the generator.

5. The vehicle of claim 1, wherein the controller is further programmed to, in response to a desired upshift of the transmission corresponding to a speed of the generator decreasing below a minimum speed required to operate a transmission fluid pump to maintain a minimum transmission fluid pressure, maintain a current gear of the transmission.

6. A vehicle comprising:
    a generator configured to recharge a battery at a maximum power output when a generator speed is above a threshold speed;
    a transmission configured to downshift during regenerative braking such that the generator speed is maintained above the threshold speed; and
    a controller programmed to, in response to an increase in battery temperature corresponding to an increase in generator speed required to maintain the maximum power output, increase the threshold speed, and in response to a desired upshift of the transmission corresponding to the generator speed decreasing below a minimum speed required to operate a transmission fluid pump to maintain a minimum transmission fluid pressure, maintain a current gear of the transmission.

7. The vehicle of claim 6, wherein the controller is further programmed to, in response to a decrease in battery temperature corresponding to a decrease in generator speed required to maintain the maximum power output, decrease the threshold speed.

8. The vehicle of claim 6, wherein the threshold speed is within a constant maximum power output region of the generator.

9. The vehicle of claim 6, wherein the threshold speed is within a constant maximum torque output region of the generator.

10. The vehicle of claim 6, wherein the controller is further programmed to, in response to a desired downshift of the transmission corresponding to system vibrations, maintain a current gear of the transmission.

11. A vehicle comprising:
    an electric machine configured to recharge a battery during regenerative braking;
    a transmission configured to shift during regenerative braking to maintain a minimum electric machine speed corresponding to a lower threshold speed of a maximum power output region, and configured to upshift during regenerative braking to decrease the speed of the electric machine if the speed of the electric machine exceeds the lower threshold speed by an allowable deviation such that a difference between the speed of the electric machine and the lower threshold speed is less than the allowable deviation and the speed of the electric machine is maintained above the lower threshold speed; and
    a controller programmed to, in response to a decrease in battery temperature corresponding to a decrease in electric machine speed required to maintain the maximum power output, decrease the lower threshold speed.

12. The vehicle of claim 11, wherein the controller is further programmed to, in response to an increase in battery temperature corresponding to an increase in electric machine speed required to maintain the maximum power output, increase the lower threshold speed.

13. The vehicle of claim 11, wherein the lower threshold speed is within a constant maximum torque output region of the electric machine.

14. The vehicle of claim 11, wherein the transmission is configured to downshift during regenerative braking to increase the speed of the electric machine such that the electric machine speed is maintained above the lower threshold speed.

15. The vehicle of claim 14, wherein the controller is further programmed to, in response to a desired downshift of the transmission corresponding to system vibrations, maintain a current gear of the transmission.

16. The vehicle of claim 11, wherein the controller is further programmed to, in response to a desired upshift of the transmission corresponding to a speed of the electric machine decreasing below a minimum speed required to operate a transmission fluid pump to maintain a minimum transmission fluid pressure, maintain a current gear of the transmission.

* * * * *